(12) United States Patent
Dunkle

(10) Patent No.: US 8,543,268 B2
(45) Date of Patent: Sep. 24, 2013

(54) CUMULATIVE LATERAL SLIDE INDICATION

(76) Inventor: Gregory D. Dunkle, Wayne, WV (US)

(*) Notice: Subject to any disclaimer, the term of this patent is extended or adjusted under 35 U.S.C. 154(b) by 448 days.

(21) Appl. No.: 12/874,955

(22) Filed: Sep. 2, 2010

(65) Prior Publication Data

US 2012/0059577 A1    Mar. 8, 2012

(51) Int. Cl.
| | |
|---|---|
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |
| G01S 1/24 | (2006.01) |

(52) U.S. Cl.
USPC .................. 701/21; 701/411; 701/493

(58) Field of Classification Search
USPC ........... 701/21, 32.3, 32.4, 32.5, 400, 412, 701/493, 408–411, 500–507; 318/588; 340/985, 988
See application file for complete search history.

(56) References Cited

U.S. PATENT DOCUMENTS

| | | | |
|---|---|---|---|
| 4,004,460 A * | 1/1977 | Whipps | 73/178 R |
| 4,074,648 A | 2/1978 | Reid et al. | |
| 4,404,664 A * | 9/1983 | Zachariadis | 367/19 |
| 4,692,868 A | 9/1987 | Wesner | |
| 4,768,153 A * | 8/1988 | Akamatsu | 701/23 |
| 5,034,895 A | 7/1991 | Johnson et al. | |
| 2003/0191562 A1* | 10/2003 | Robertson et al. | 701/21 |
| 2004/0153222 A1* | 8/2004 | Puchkoff | 701/21 |
| 2005/0090971 A1* | 4/2005 | Bulatao et al. | 701/200 |
| 2005/0216184 A1* | 9/2005 | Ehlers | 701/200 |

OTHER PUBLICATIONS

Mohammed Oudghiri, Mohammed Chadli, Ahmed Ei Hajjaji, Lateral Vehicle Velocity Estimation Using Fuzzy Sliding Mode Observer, Procesedings of the 15th Mediterranean Conference on Control & Automation, Jul. 27-29, 2007, Athens-Greece.*

* cited by examiner

*Primary Examiner* — Khoi Tran
*Assistant Examiner* — Abby Lin
(74) *Attorney, Agent, or Firm* — Giblin Law Offices; John J Giblin, Jr.

(57) ABSTRACT

A method for determining the cumulative lateral slip of a towboat or combination barge tow/towboat. The method comprises providing two positional sensor instruments mounted at either end of a combination barge tow, each positional sensor capable of determining its geographical location from radio transmissions from, e.g., GPS satellites. The velocities of each positional sensor, both parallel and lateral (perpendicular) to the bearing of the barge tow, are determined. The cumulative sum of the absolute differences of the lateral velocities of the two positional sensors over time is calculated, stored and displayed by a microcomputer.

8 Claims, 2 Drawing Sheets

CUMULATIVE LATERAL SLIDE INDICATION

BACKGROUND

The technical field of the invention is methods for improving navigation and piloting efficiency of maritime vessels, especially of inland waterway tow boats.

In the maritime industry, many bulk goods, both dry and liquid, are transported on the inland and intra-coastal waterway systems in unpowered barges. The inland waterway system in the United States includes major rivers, such as the Mississippi, Ohio and Missouri Rivers. Intra-coastal waterways include bays and sounds along the East Coast of the United States, as well as various canals connecting those bodies of water.

Unpowered barges are typically pushed along the waterways by a towboat. A towboat has sufficient power to push at least 9-15 fully loaded barges. When moving along a waterway, the barges are secured together in a rectangular grid, called a barge tow. Typical barge tows may be 2 or 3 barges wide by 3 to 5 barges long. The width of the tow is generally limited by the locks along the waterway through which the barge tow will have to pass. On the Mississippi River downstream of St. Louis, Mo., where no locks are present, barge tows may comprise as many as 40-50 barges. The larger towboats needed to push these larger barge tows are referred to in the industry as line boats.

For moving a barge tow along a waterway, the tow boat is secured to the aft row of barges of the barge tow. The towboat is typically secured in a manner preventing any relative rotation of the tow boat with respect to the barge tow. When a tow boat maneuvers by rotating its rudder, the combination barge tow/tow boat turn as a single unit. Because of the large mass of a fully-loaded barge tow, a towboat must impart relatively large amounts of energy to overcome the momentum of the barge tow, either in initially making way, in turning or changing course, or in coming to a stop. In maneuvering along the bends and meanders of the inland waterways, the course of the barge tow must change frequently. To change the course of a barge tow, the towboat must apply a turning moment well before the actual bend in a river, and apply a reverse turning moment well before the completion of the turn, to keep the barge tow within the river channel. An inexperienced helmsman will often under- or over-steer in the river bends, necessitating repeated corrections to bring the combination barge tow/tow boat on course within the river channel. The repeated starboard and port corrections by a helmsman of the barge tow towboat combination will be apparent in the wake of the towboat, which will appear as a series of lateral undulations stretching back from the stern of the towboat. These repeated corrections represent wasted fuel and wasted time for the towboat.

In addition to receiving GPS satellite transmissions and trilaterating its current position, GPS receivers often contain programming which interpolates a series of geographical positions to determine the direction and speed of a moving positional sensor by use of regression analysis on a series of recent positional fixes.

More advanced GPS receivers may as well include an integral electronic compass. Such devices incorporate integrated circuits having a magneto-resistive sensor. This allows a determination of which way the GPS receiver is terrestrially aligned, i.e., its heading with respect to either true or magnetic north, regardless of which direction the GPS receiver determines it is moving. Further, regression analysis on a series of subsequent headings can determine the rate at which a positional device is turning or rotating, even if remaining at a fixed geographical location.

GPS receivers may display their location and other derived information on an integral screen or display. They may also transmit the data either by cable or by radio or other wireless means, to another electronic device, such as a computer. In a computer, further numerical analysis may be performed on the data transmitted by the positional device.

The prior art has various examples of methods of automatic controls of marine vessels to improve the maneuvering of the vessels over that of manual helm control. For example, U.S. Pat. No. 5,034,895, entitled "Enhanced Performance Bias Integrator for Marine Automatic Pilot System," issued to Johnson et al. on Jul. 23, 1991, teaches a rudder order bias integrator of a marine autopilot for removing offsets by calculating a correction to any heading error bias resulting from wind, seaway effects or hull, propulsion or cargo assymetries (col. 1, II. 30-39). However, the rudder order bias integrator disengages during a turning maneuver of the ship, though it automatically reengages at the end of the turning maneuver (col. 2, II. 22-23). Other references in the prior art, including U.S. Pat. No. 4,074,648, issued Feb. 21, 1978 to Reid and Wesner and U.S. Pat. No. 4,692,868, issued Sep. 8, 1987 to Wesner. These also teach means of correcting the heading of a marine vessel. However, they likewise do not function during an intended heading change of the vessel.

SUMMARY OF THE INVENTION

Disclosed herein is a method of providing feedback of the performance of the helm during a turning maneuver of a marine vessel, particularly a combination barge tow/towboat (hereinafter, "combination barge tow"). The method comprises providing a position sensor at the fore and aft ends of the combination barge tow. The position sensors determine their positions continually by receiving radio signals from navigational devices, such as global positioning system satellites. From the geographical positions of the two position sensors, the heading of the combination barge tow is determined, as well as the direction, speed and, optionally, rate of turn of the position sensors. From these variables, the lateral speed, or slide, of the fore and aft position sensors are determined. The absolute difference of the two slide values are cumulatively added and periodically reported or displayed. The calculations of heading, direction, speed and rate of turn of the position sensors may be performed within the position sensors or within a stand-alone computer. The calculation of the combination barge tow's heading and its cumulative lateral slide are performed in the stand-alone computer.

DETAILED DESCRIPTION OF THE PREFERRED EMBODIMENTS

As used herein, the words or phrases below are defined as follows:

"Combination barge tow/towboat" or "combination barge tow" refers to a single or a plurality of unpowered barges secured together, and a towboat secured by its bow to one end of the barge(s).

"Positional sensor" refers to a device constructed or configured to determine its geographical position automatically and continually using received radio signals transmitted from a plurality of navigational radio transmitters, for example, a Global Positioning System ("GPS") satellite.

"Heading" means the geographic direction to which the longitudinal axis of the combination barge tow is directed or aligned. The geographical direction regards an established point of reference, such as true north or magnetic north. "Heading", as used here, does not refer to the direction in which the combination barge tow or a positional sensor is moving.

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Figure 1:
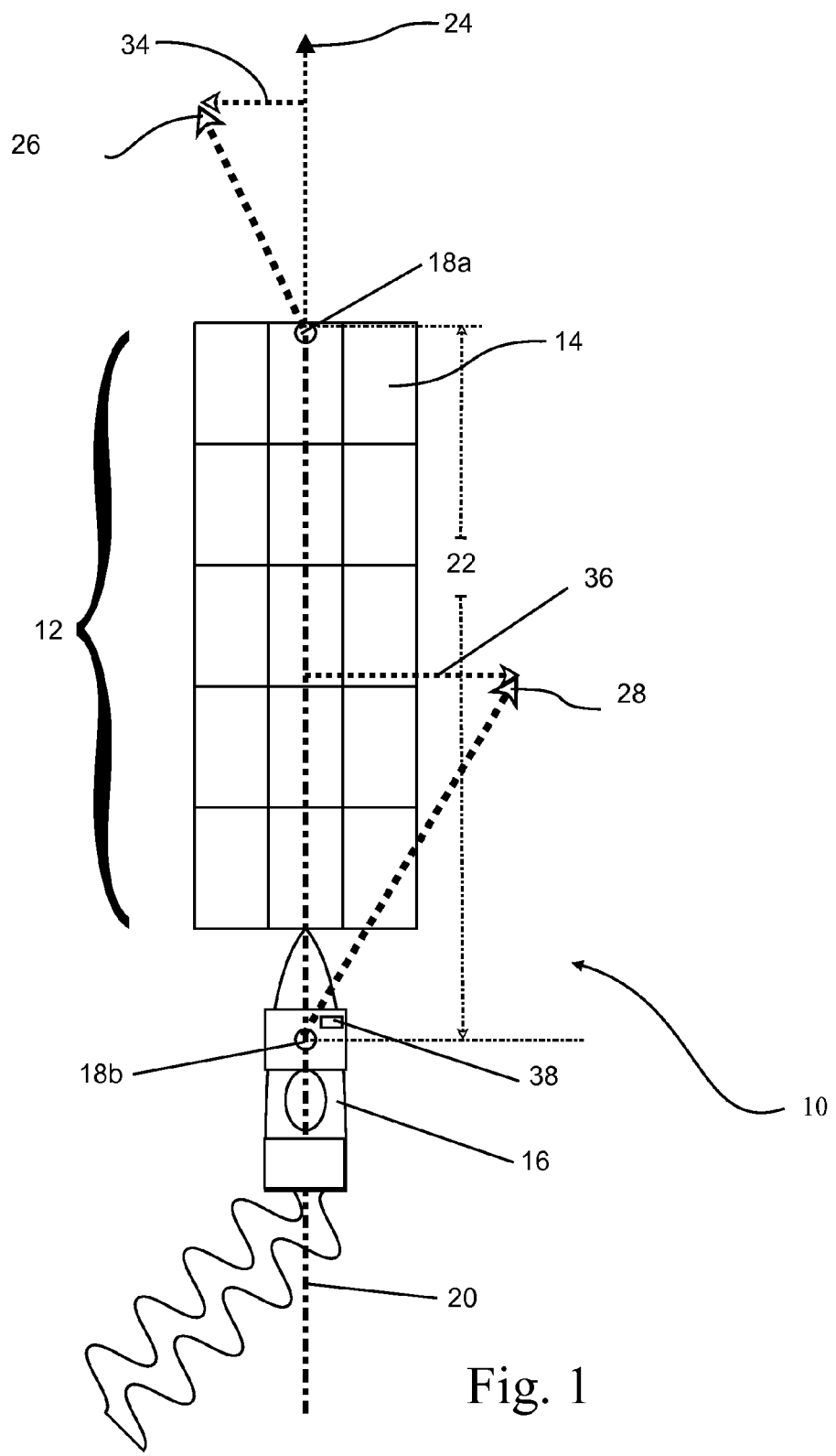
FIG. 1 is an illustration of a combination barge tow/towboat with first and second position sensors.

In the following discussion, all references to elements are as shown in FIG. 1, unless otherwise indicated.

A combination barge tow 10 comprises one or, typically, a plurality of unpowered barges 14 secured together. The group of barges 14 secured together is referred to as a "barge tow" 12 in the maritime industry. The bow of a towboat 16 is secured to the aft end of the barge tow 12. The tow boat 16 is secured in a manner precluding turning of the towboat 16 with respect to the barge tow 12, thereby maintaining parallel or collinear alignment of the longitudinal axis 20 of the towboat 16 and barge tow 12.

At least two positional sensors 18a, 18b are disposed on the combination barge tow 10. One positional sensor 18a is disposed at the forward end of the barge tow, the other positional sensor 18b on the tow boat 16 or, less preferably, on the aft end of the barge tow 12. The two positional sensors are aligned on the longitudinal axis of the combination barge tow 10. When installed, the distance between the two positional sensors 22 is measured or determined.

Each positional sensor 18a, 18b comprises a receiver or other radio navigation device to determine its terrestrial position continually using existing radio navigational transmitters. As used herein, "terrestrial position" refers to the position on the surface of the Earth with respect to a global reference or coordinate system, such as latitude and longitude. Preferably, each positional sensor 18a, 18b is a receiver capable of receiving timing signal transmissions from satellites in the Global Positioning System ("GPS"). The Global Positioning System comprises a constellation of at least 24 satellites in medium earth orbit, each of which continually transmits a data packet including the time of the packet's transmission and the ephemeris of the satellite. If a GPS receiver can receive data packets from at least four GPS satellites, then the receiver can fix its geographical latitude, longitude and altitude using trilateration of the received data packets.

Other acceptable, though less desirable, types of receivers for the positional sensors include eLORAN and radio direction finders ("RDF").

A first positional sensor 18a is mounted amidships at the forward end of the barge tow 12. A second positional sensor 18b is mounted on the tow boat 16 or, less preferably, on the aft end midships of the barge tows 12. The two positional sensors 18a, 18b are mounted collinear with the longitudinal axis 20 of the combination barge tow 10. The distance 22 between the two positional sensors 18a, 18b is determined.

Also provided is a computer 38, such as a laptop computer, which typically will be disposed on the bridge of the tow boat 16. The computer 38 has appropriate means to receive and input the data transmitted by the first and second positional sensors 18a, 18b. This may include an RS-232 cable connecting suitable serial ports between the positional sensors 18a, 18b and the computer 38. It may also be a wireless connection using radio modems connected to each of the positional devices 18a, 18b and computer 38.

The computer 38 has memory on which is embedded programming to carry out the necessary calculations for determining the cumulative lateral slide of the combination barge tow 10. Contingent on the capabilities of the chosen positional sensors, the computer is programmed to at least calculate the cumulative sum of the absolute differences of the lateral slides of the two positional devices, as described below. See 48, FIG. 2. If less sophisticated positional sensors, without advanced calculating capabilities, are used, the computer is necessarily also programmed to calculate the heading 24 of the combination barge tow 10 and the lateral velocities of the two positional devices. See 44, 46, FIG. 2.

The computer 38 is any one of numerous available machines having at least one microprocessor and some form of programmable memory, on which the appropriate machine instructions are programmed. Preferably, the computer 38 is a laptop computer.

In determining the cumulative absolute difference of the lateral slide, the first and second positional devices 18a, 18b are mounted to the fore end of the barge tow 12 and on the tow boat 16 or aft of the barge tow 12, respectively. See 40, FIG. 2. If the positional sensors 18a, 18b do not have an electronic compass, then the two must be mounted along the longitudinal axis 20 of the combination barge tow 10, and the distance between the two devices 22 must be determined as shown in FIG. 1. If the positional sensors 18a, 18b have a GPS compass, then their antennas must be aligned parallel to the longitudinal axis 20 of the combination barge tow 10. Power supplies are connected to the two positional sensors, as needed. The serial communication ports of the positional sensors 18a, 18b are connected to those of the computer 38 with RS-232 serial cables or, preferably, radio modems.

Figure 2:
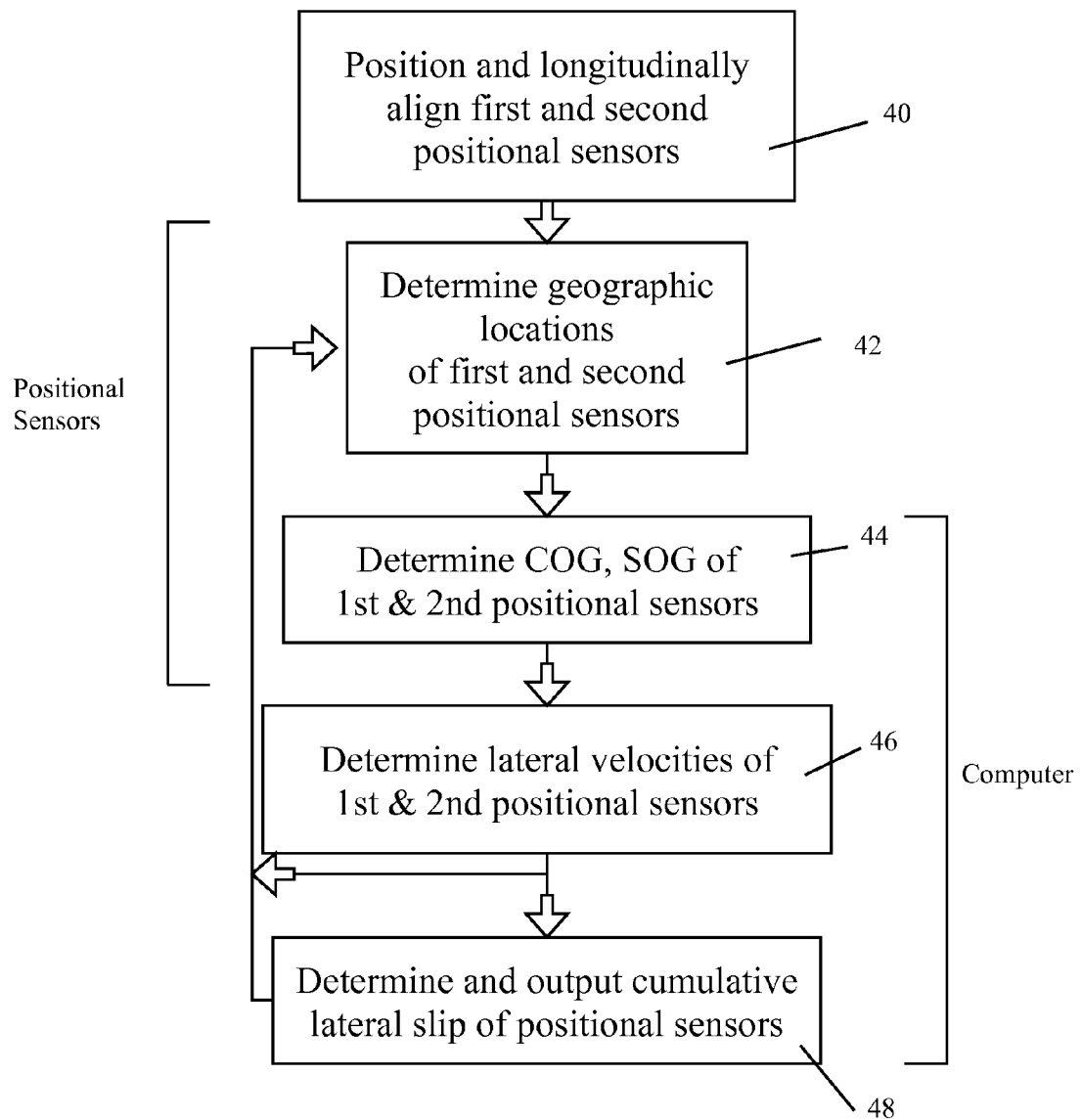
FIG. 2 is a flowchart of the method for determining cumulative lateral slide of the combination barge tow/towboat.

Once the combination barge tow 10 is underway, the positional sensors will implement the first step in the method, to attempt to receive timing signal transmissions from the satellites of the Global Positioning System. Referring to FIG. 2, if signals from at least four satellites are receivable, the positional sensor determines its terrestrial position, as latitude and longitude coordinates, and transmits the coordinates to the computer 42. The positional sensors 18a, 18b continually and repeatedly repeat the process of receiving the GPS satellite timing signals and determining its terrestrial coordinates, in cycles having durations of several seconds. After each cycle, the new geographical coordinates are transmitted to the computer.

If equipped with a microprocessor and appropriate memory, each positional sensor 18a, 18b has programming instructions to determine its terrestrial velocity by regression analysis on a series of its most recent position coordinates. Terrestrial velocity is a vector quantity, comprising a course component, represented by the direction of the vectors 26 and 28, and a magnitude, or speed component, represented by the length of the vectors 26 and 28. The terrestrial velocities of the two positional sensors do not necessarily coincide with the heading of the combination barge tow 10. If the barge tow is in a turning maneuver, or if it is affected by lateral water current, the terrestrial course, or Course over Ground (COG) of each positional sensor 18a, 18b, may be at an angle to heading 24 of the combination barge tow 10. The corresponding terrestrial speed, or Speed over Ground (SOG) component of the terrestrial velocity, of the positional device equals the distance traveled over the earth's surface in the direction of its course over the relevant time period. The terrestrial velocities of the two positional sensors are transmitted to the computer in a format representing their COG and SOG. See 44, FIG. 2.

If the positional sensors 18*a*, 18*b* are not equipped with electronic circuits or programming to determine the COG and SOG, these quantities are instead calculated by the computer 38 in the same manner, using regression analysis over a series of the most recent terrestrial coordinates of each positional sensor.

From its COG and, SOG components of the terrestrial velocity vector 26, 28 and heading 24 of the combination barge tow 10, the lateral velocity 34, 36 of each positional sensor is determined for the relevant time period. See 46, FIG. 2. By the rules of trigonometry, the lateral speed of the positional sensor equals the sine of the angle between the barge tow heading and the COG of the positional sensor, multiplied by the SOG component of the terrestrial velocity 26, 28 of each positional sensor 18*a*, 18*b*. These calculations are performed by the computer's 38 programming and the results for each positional device 18*a*, 18*b* stored in its memory.

The cumulative lateral slide of the combination barge tow 10 is then determined by summing the absolute differences between the lateral velocities 34, 36 of the two positional sensors 18*a*, 18*b* for each time period. See 48, FIG. 2. The computer 38 may maintain a running cumulative sum of the absolute differences, adding new values as they are determined or received from the positional sensors 18*a*, 18*b*. Alternatively, the computer 38 may maintain an array or database of absolute differences and sum all these values when requested or at a predetermined time, such as at the end of the voyage.

In the most preferred embodiment of the present invention, two positional sensors 18*a*, 18*b* are provided comprising both a GPS receiver and an electronic compass, with wireless data transmission capability. Manufacturers of suitable devices include Hemisphere GPS Inc. and Furuno U.S.A. Inc.

In another embodiment, using simpler GPS receivers without a GPS compass, the computer 38 determines the heading 24 of the combination barge tow 10 from the terrestrial positions of the two positional sensors, using well-known trigonometric principles.

In another embodiment, the positional sensors 18*a*, 18*b* use the simplest GPS receivers providing only terrestrial location data and the computer 38 calculates the COG and SOG of the positional sensors 18*a*, 18*b*, and using regression analysis on a series of most recent terrestrial positional locations, as described previously.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A method for determining a cumulative lateral slide of a vessel, comprising:
   A. providing a first and a second positional sensor disposed at either end of the vessel, each of said positional sensors comprising a navigational radio receiver to receive navigational data, said positioning sensor adapted for using the navigational data to perform sub-steps of:
   i. periodically determining a terrestrial location of the positional sensor,
   ii. determining a terrestrial velocity of the positional sensor, and
   iii. transmitting the terrestrial location and the terrestrial velocity as formatted data; B. providing a computer having a processing unit and memory, the memory having embedded thereon instructions to repeat sub-steps of:
   i. inputting the formatted data from the first and second positional sensors,
   ii. determining a heading of the vessel,
   iii. determining a lateral velocity component of each of the velocities of the first and second positional sensors relative to the heading of the vessel,
   iv. determining a cumulative sum of absolute differences between the lateral components of the velocities of the first and second positional sensors, and
   v. outputting the cumulative sum.

2. The method of claim 1, wherein the navigational radio receiver is a Global Positioning System receiver.

3. The method of claim 1, wherein the navigational radio receiver is selected from a group consisting of a Global Positioning System receiver, an eLORAN receiver and an RDF receiver.

4. The method of claim 1, wherein the vessel is a combination barge tow.

5. A method of determining a cumulative lateral slide of a vessel, comprising:
   A. providing first and second positional sensors disposed at either end of the vessel, said positional sensors comprising a navigational radio receiver to receive navigational data, each of said positioning sensors adapted for using received navigational data to perform sub-steps of periodically:
   i. determining a terrestrial location of the positioning sensor;
   ii. determining a terrestrial velocity of the positional sensor;
   iii. determining a heading of the vessel; and
   iv. transmitting the terrestrial location, the terrestrial velocity and the vessel heading;
   B. providing a computer having a central processing unit and memory, the memory having recorded thereon instructions to repeat sub-steps of:
   i. inputting the determined terrestrial locations and terrestrial velocities of the positional sensors and the vessel heading,
   ii. determining lateral velocity components of the terrestrial velocities of the first and second positional sensors,
   iii. determining a cumulative sum of absolute differences between the lateral velocity components of the terrestrial velocities of the first and second positional sensors, and
   iv. outputting the cumulative sum.

6. The method of claim 5, wherein the navigational radio receiver is a Global Positioning System receiver.

7. The method of claim 5, wherein the navigational radio receiver is selected from a group comprising a global positioning system receiver, an eLORAN receiver and an RDF receiver.

8. The method of claim 5, wherein the vessel is a combination barge tow.

* * * * *